INVENTORS
JOHN T. YOUNG
CHARLES E. MICHELS
THOMAS C. ZIMMERMAN
GILBERT M. HAGEMANN

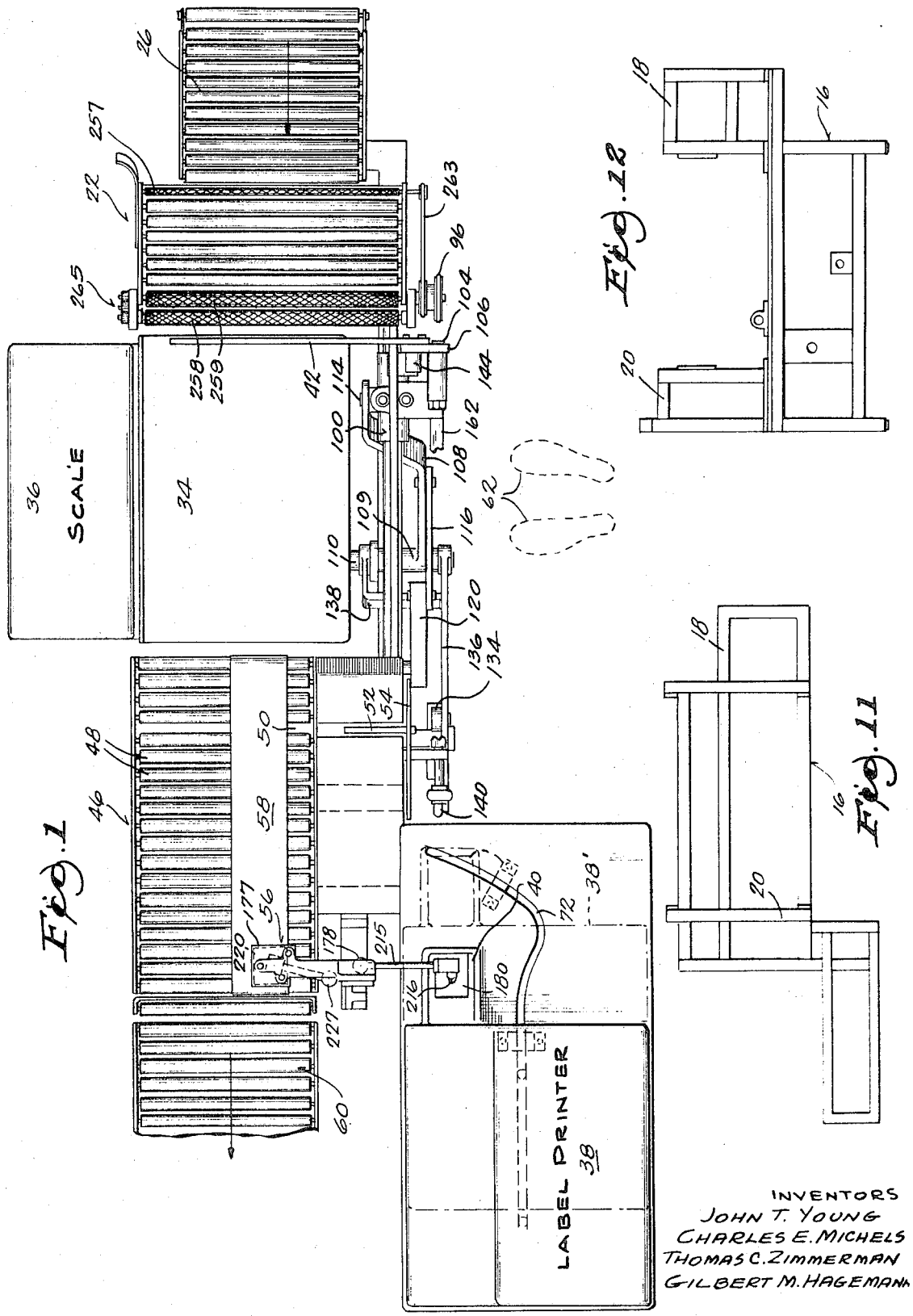

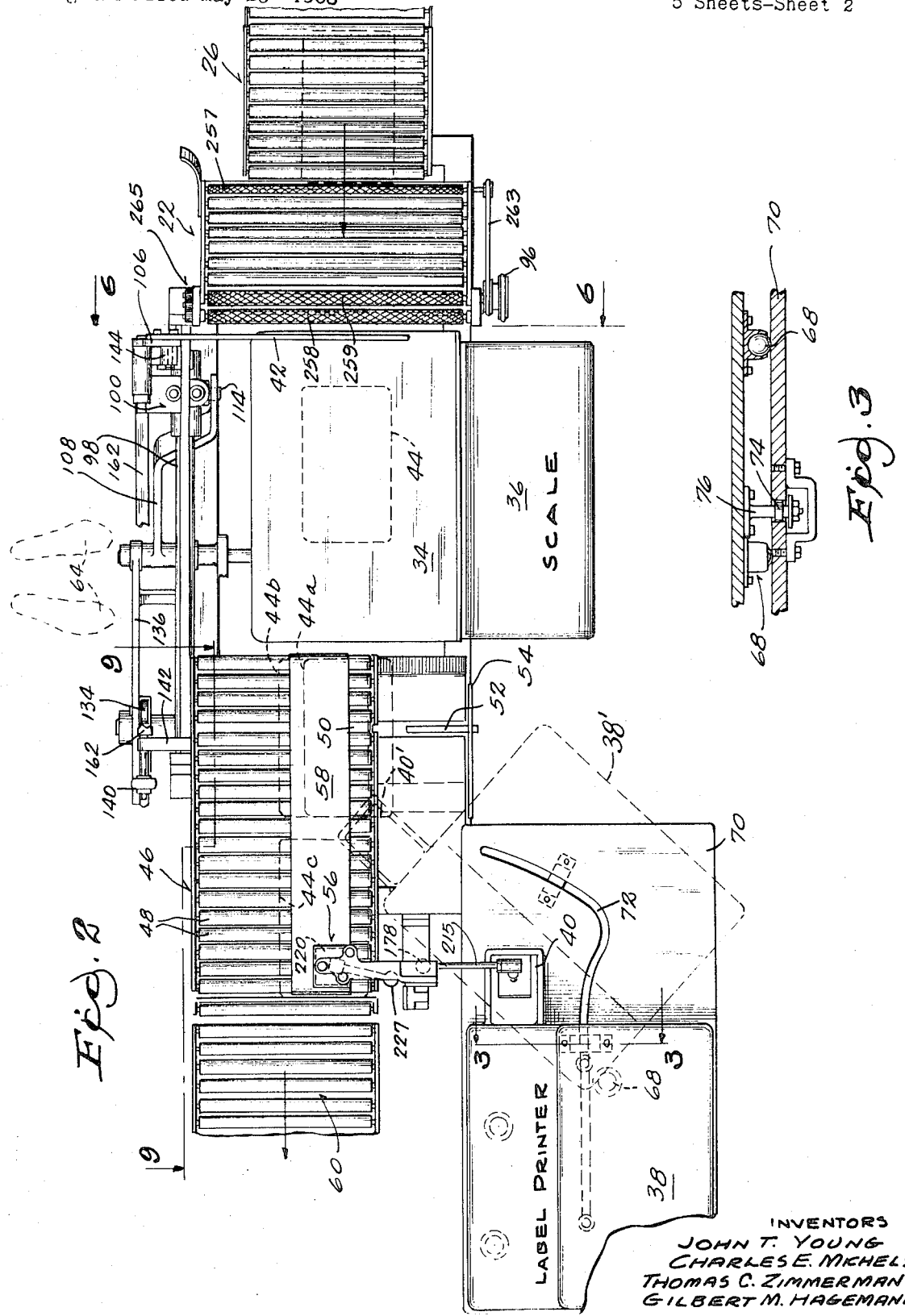

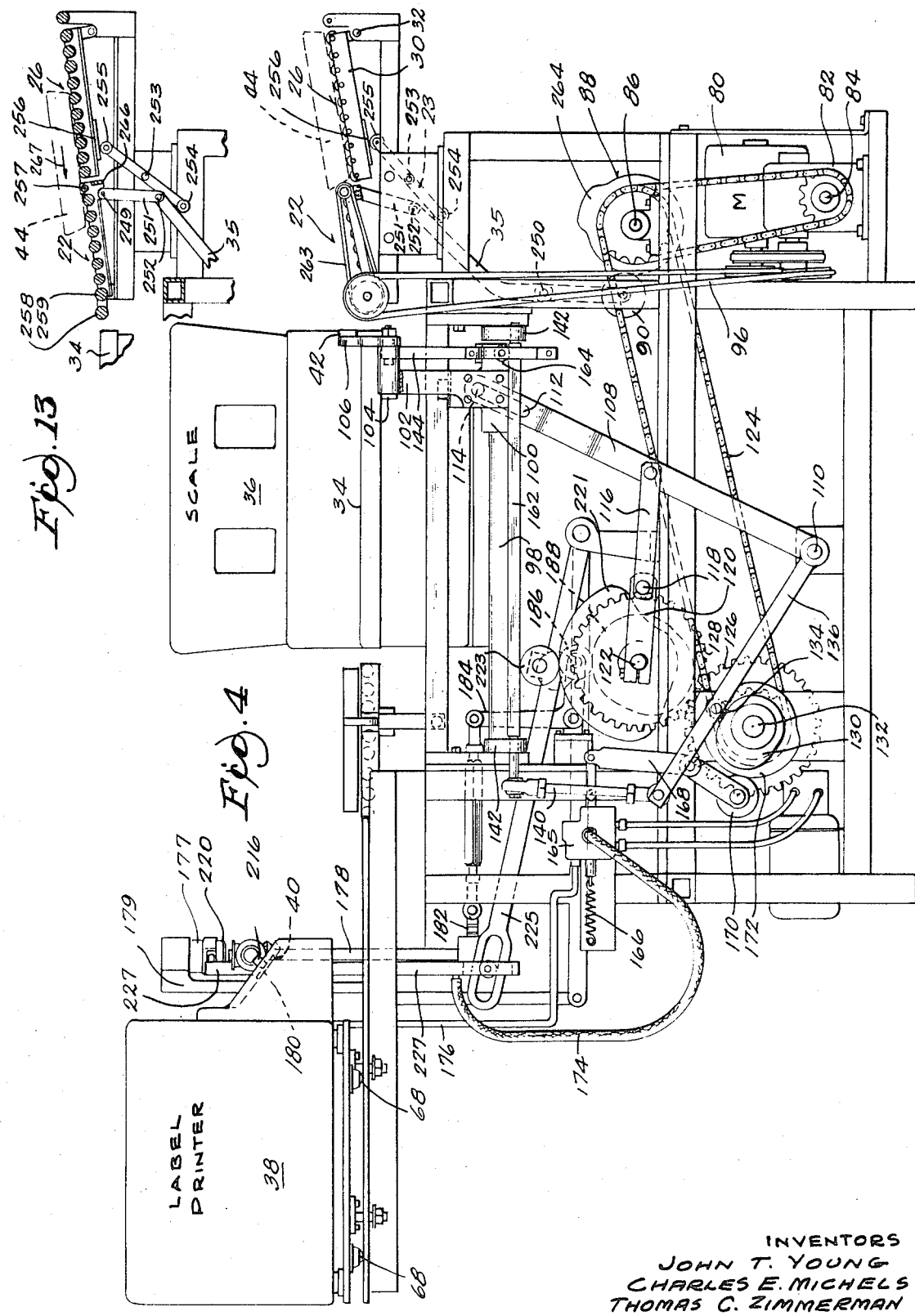

BY Wheeler, Wheeler, House & Clemency
ATTORNEYS

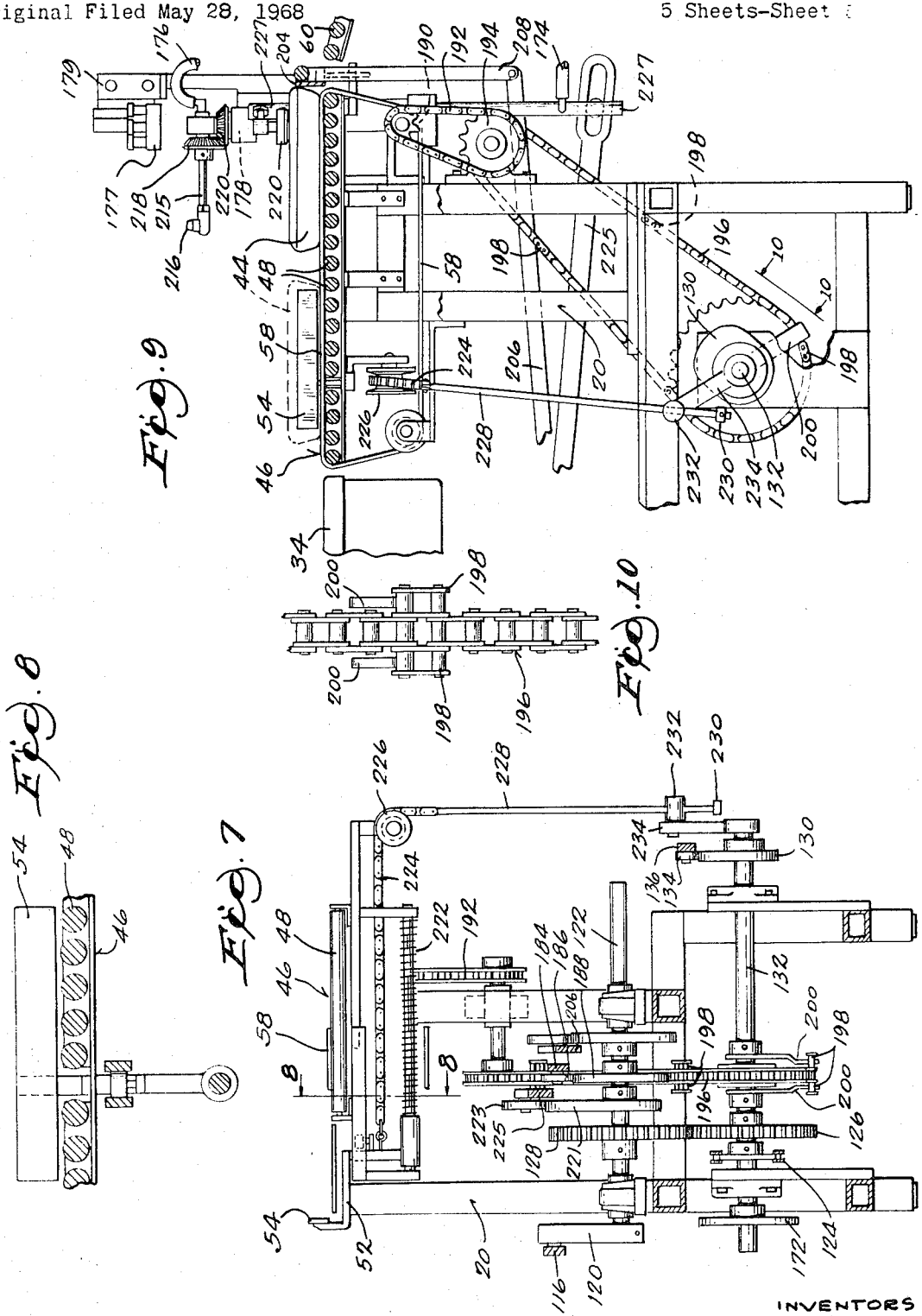

United States Patent Office
3,733,236
Patented May 15, 1973

1

3,733,236
REVERSIBLE MANUAL AND AUTOMATIC
LABELING MACHINE
John T. Young, Lake Bluff, Ill., and Charles E. Michels, Racine, and Thomas C. Zimmerman and Gilbert M. Hagemann, Franksville, Wis., assignors to Reliance Electric Company, Toledo, Ohio
Continuation of abandoned application Ser. No. 732,750, May 28, 1968. This application July 22, 1970, Ser. No. 64,041
Int. Cl. B65g 47/26, 69/00; G01g 13/00
U.S. Cl. 156—360  4 Claims

ABSTRACT OF THE DISCLOSURE

Between input and output conveyors is an opening in which a computer scale may be reversed to face toward either side of the machine, parts required for propelling the workpiece across the scale table being interchangeable from one side to the other. Regardless of scale position, mechanism associated with the output conveyor rectifies successive workpieces on the conveyor rather than the scale platform to align them with the labeler for automatic operation irrespective of the side toward which the scale faces. The label printer remains at one side of the output conveyor and is operable either manually or automatically. The printer is mounted for bodily movement to facilitate manual operation whether the operator stands at one side or the other side of the machine.

---

This application is a continuation of application Ser. No. 732,750, filed May 28, 1968, now abandoned.

BACKGROUND OF THE INVENTION

The general organization and many of the detailed parts of the invention are disclosed in prior U.S. Pats. 3,194,710 and 3,264,161. Neither of those patents, however, provides for any change in orientation or change of operator position. Operator position becomes important when the operator is required to resort to manual operation of the labeling device due to an irregular sized package, or for any other reason. But for the present invention, what would be convenient for him at one side of the machine would become virtually impossible when he is at the other side of the machine.

The weighing scale and its computing mechanism for pricing the workpiece, and the printing of the computed figures on a label are all known on the basis of the prior patents above mentioned. Likewise many of the controls are known. However, the moving of the controls or operating parts from one side of the machine to the other consequent upon reversal of scale position, presented problems and, in the initial embodiments of this invention, required that a number of parts be bodily replaced for substitution by other parts.

Moreover, the matter of rectifying the position of work or aligning it with regard to the labeler presented problems, and it was found desirable that this rectification not occur on the scale platform. Other problems were involved in bodily moving the label printer in order to make it accessible at either side of the device, according to the position of the operator.

SUMMARY OF THE INVENTION

The invention consists in a simplified conversion of a weighing and labeling machine to facilitate different positions of orientation between the source of wrapped material and the point of delivery and further to permit an operator to stand at either side of the machine for the manual application of labels to abnormal packages.

2

The invention contemplates the provision of a machine frame having elevated input and output conveyor tables between which there is a gap in which the computer scale is reversibly positioned to face either side. Of the various operating connections mounted on the machine frame only some, such as the work propelling arm and its operating connections, require transfer from one side of the other to function the machine according to scale position.

It is a feature of the preferred embodiment of the invention that the parts which require to be moved incident to conversion of the machine are all interchangeable from one side to the other without requiring substitution.

A related invention is the mounting of the label printer for movement from its normal position for automatic operation to a new position for manual label application. If the operator is at the opposite side of the machine, the labeler is not only advanced toward the scale but is bodily shifted obliquely to present the label to an operator at the other side of the machine.

A related invention concerns the use of a rectifying arm which is effective during automatic operation, regardless of scale position, to align with the label applying head a workpiece which has been weighed and for which the selling price has been computed and printed on the label.

Other objects, features, and advantages of the invention will appear from the following disclosure.

DESCRIPTION OF THE DRAWINGS

FIG. 1 is a plan view of a weighing and labeling machine emboding the invention.

FIG. 2 is a plan view of the same machine as modified for operation from a station at the opposite side of the apparatus.

FIG. 3 is a view taken in section on the line 3—3 of FIG. 2.

FIG. 4 is a front elevational view of the machine in the orientation shown in FIG. 1.

FIG. 7 is a view taken in section on the line 7—7 of FIG. 4.

FIG. 8 is a view on an enlarged scale taken in section on the line 8—8 of FIG. 7.

FIG. 9 is a view taken in section on the line 9—9 of FIG. 2.

FIG. 10 is a view on an enlarged scale taken on the line 10—10 of FIG. 9.

FIG. 11 is a plan view of the basic frame, with the scale and all of the operating parts omitted.

FIG. 12 is a view in front elevation of the frame parts illustrated in FIG. 11.

FIG. 13 is a fragmentary side elevation showing the infeed conveyor or indexer in a different position from that shown in FIG. 4.

PREFERRED EMBODIMENTS OF THE INVENTION

Figure 6:
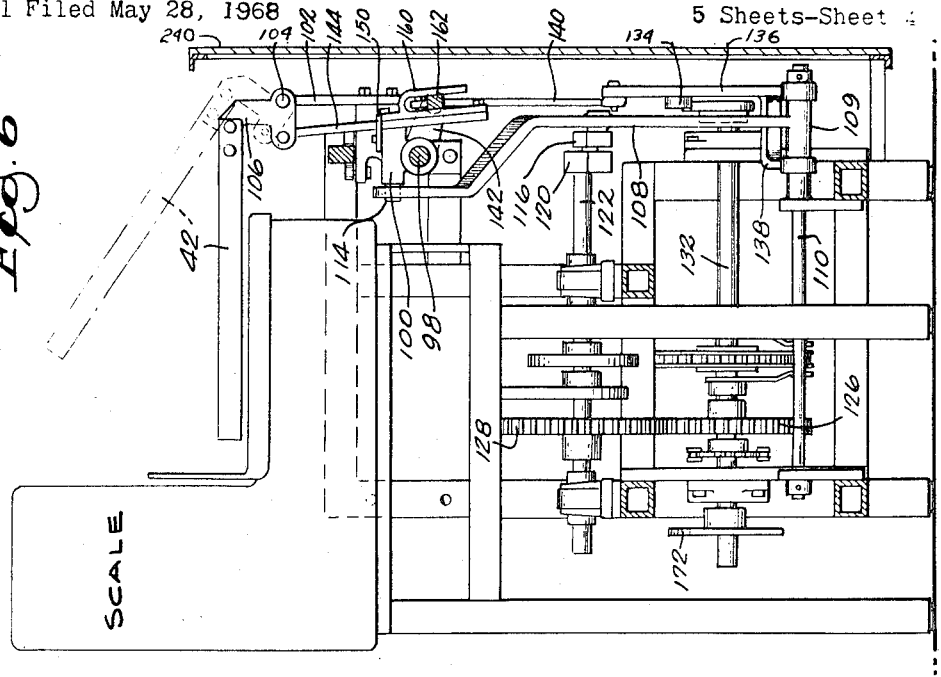
FIG. 6 is a view in transverse section on the line 6—6 of FIG. 2.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Basic frame 16 (FIGS. 11 and 12) has elevated tables 18 and 20 for the infeed conveyor 22 and the outfeed conveyor 46 respectively. A workpiece arriving on the gravity supply conveyor 26 (FIGS. 2 and 4) comes to rest against the frame on the elevated receiving end of the infeed conveyor 22. Conveyor 22 is pivoted about its driven end. The frame 30 of the supply conveyor 26 has a pivot at 32 at its work receiving end. When the scale platform 34 is free to receive an additional workpiece, lever 35 (FIG. 4) draws the receiving end of frame 22 downward and oscillates lever 23 to move frame 30 upwardly, thereby to permit the workpiece to ride onto the conveyor 22 for delivery onto table 34.

As explained in the prior patents above identified, the weight of the workpiece operates a computer mechanism in the scale head 36 to effect the functioning of a label printer 38 and the delivery of a printed label onto the label feed chute 40. As printed the label will include the selling price of the weighed workpiece, and, usually, the weight and price per pound.

The scale and related label printer constitutes no part of the present invention, being described in former patents above identified. The printed label has a thermo-plastic adhesive which is partly softened by a heater (not shown) associated with the label feed chute 40.

As soon as the label is delivered to the feed chute a work propelling arm 42 (FIG. 2) engages the weighed workpiece 44 to advance it across the scale table 34 onto the delivery conveyor 46. The latter comprises rollers 48 which are quite close together except at one point where there is clearance 50 for the arm 52 of a rectifier plate 54. The rectifier plate is elongated parallel to the path of the work and is adapted to move transversely across the conveyor 46 to push the workpiece 44 from the position indicated in dotted lines at 44a in FIG. 2 to the position indicated in dotted lines at 44b in FIG. 2. Regardless of how or where the workpiece comes to rest after being moved by arm 42 onto conveor 46, the object is to so align the workpiece with the ultimate desired position at 44c in FIG. 2 so that one corner of the workpiece will be properly oriented to lie directly beneath the point at which the label should be applied thereto by the label applicator 56.

The output conveyor rollers are encircled by a belt 58 desirably made of material to which soil does not readily adhere. As will hereinafter be explained, the conveyor rollers and belt of the discharge conveyor 46 are operated intermittently, the operation being suspended when the workpiece is in position 44a and being resumed to propel the workpiece from position 44b to position 44c. At this point, during further suspension of conveyor operation, the label is applied to the workpiece. Meantime, another workpiece will have been weighed and pushed onto the conveyor 46 and will have been rectified. During the operation of the conveyor 46, the labeled workpiece is delivered onto the discharge conveyor 60, to be followed, in due course, by other workpieces similarly advanced and labeled.

When the work does not require manual operation, the weighing, rectifying and labeling proceed automatically. However, when it is known that some of the workpieces will be irregular in size or shape and will therefore require manual labeling, the operator may stand in the position indicated at 62 in FIG. 1 where he can pick the workpiece manually from the scale and apply it manually to a label on the feed chute 40, the label being face down on the feed chute and therefore adapted to have the softened thermoplastic on its exposed surface engaged by the inverted workpiece for adherence thereto. It will be observed that the reading and computing section 36 of the scale is now at the opposite side of the machine from the operator's position 62. Otherwise the upwardly extending computer section 36 would interfere with the operation above described. For convenience the label printer is mounted for movement to 38' (FIG. 1). The mounting is described below.

If the operator is to stand at 64 (FIG. 2) the scale is turned 180°. This change involves the removal of some of the mechanism from the side of the machine which is closest to the observer in FIG. 1 and the replacement of such mechanism at the opposite side of the machine where it is proximate the operator station 64. Particularly involved is the workpiece propelling arm 42 and the means for the operation thereof as hereinafter explained. During automatic operation this arm must push each successive workpiece across the scale platform 34 and onto the conveyor 46. Before the arm returns, another workpiece will have been fed into the position of workpiece 44 in FIG. 2 (the same being true in FIG. 1). Thereupon it becomes necessary to lift the arm during its return sweep in order to clear the newly arrived workpiece and then to restore the arm to its normal position so that when it again sweeps across the scale platform it can push the workpiece before it onto the conveyor 46 on which it is labeled.

When the machine is required to be operated manually as well as automatically, the position 64 of the operator as shown in FIG. 2 presents problems because the labeling and printing mechanism 38 is now on the opposite side of the machine from the operator. Accordingly, this entire mechanism is freely movable on transport means such as casters or rollers 68 (FIGS. 2 and 3) from the position shown in full lines to the position shown in dotted lines and marked 38' in FIG. 2. The mechanism moves across a platform 70 provided with a guide slot 72 for the rollers 74 on spaced vertical fingers 76, 78, whereby the label delivery chute 40 moves from the retracted position shown in full lines in FIG. 2 to an advanced position shown at 40' in dotted lines in FIG. 2. In the latter position it is readily accessible to an operator standing at 64 so that the workpiece 44 can readily be picked up by the operator and pressed against the label.

While the mechanism for operating the various parts of the apparatus have mostly been described in U.S. Pats. 3,194,710 and 3,264,161, a brief summary will be given here as a basis for showing how such parts as must be moved from one side of the machine to the other may readily be interchanged between their respective positions.

The motor 80 drives a gear reducer 82. From output shaft 84 there is a chain drive to a shaft 86 which carries cam 88. Operated by the cam is a follower 90 on a bell crank 35 link-connected to oscillate the receiving end of conveyor 22 in a downward direction. The lever 23 is then oscillated to raise the delivery end of the frame 30 of the supply conveyor 26 about the pintle 32.

The infeed conveyor 22 is driven by belt 96 so that when conveyors 26 and 22 come into registry a workpiece on the supply conveyor 26 will advance onto the power driven rolls of conveyor 22 to be propelled onto the scale platform 34.

Figure 5:
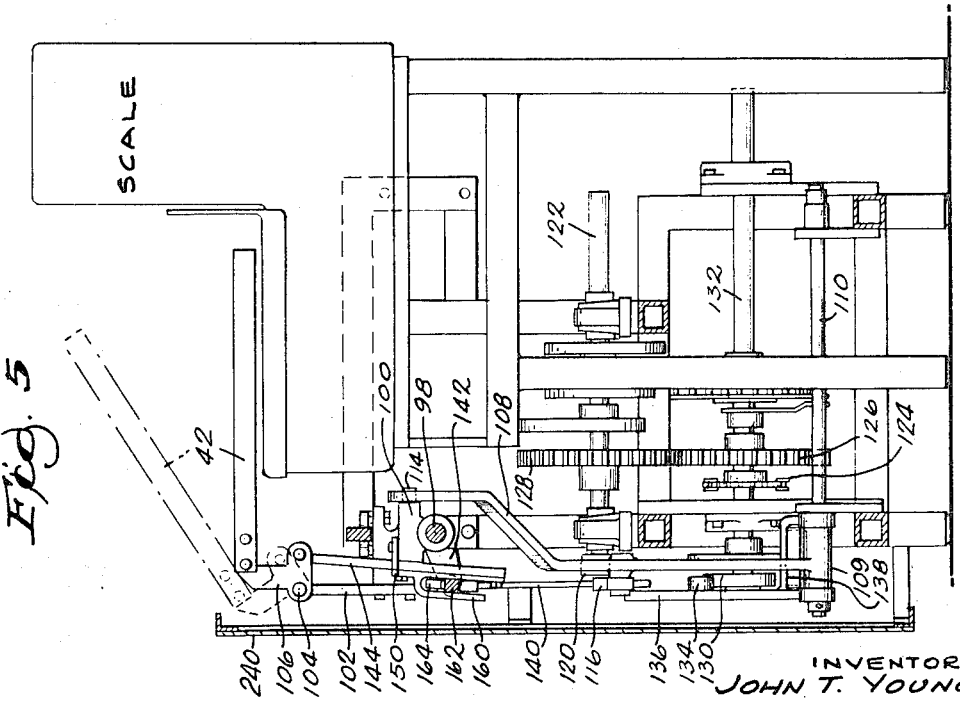
FIG. 5 is a view in transverse section on the line 5—5 of FIG. 1.

Reciprocable longitudinally of the machine on the supporting bar 98 is a carriage 100 (FIGS. 4 and 5) which has an upstanding arm 102 to which is pivoted at 104 a bracket 106 which carries the work propelling arm 42 for movement with the carriage across the scale platform 34, the arm being independently movable pivotally from the full line position of FIG. 5 (and FIG. 6) to the dotted line elevated positions shown in these views.

For reciprocating the carriage there is provided a lever 108 integral with a bearing sleeve 109 fulcrumed on the pintle shaft 110. The shaft 110 is axially reciprocable bodily when the bearing sleeve 109 is removed from the end of the shaft, from the position shown in FIG. 5 to that of FIG. 6. When the shaft is in the new position shown in FIG. 6 the bearing sleeve may be applied to the opposite end thereof. In both positions the sleeve provides a fulcrum for the arm 108 which, in the course of its oscillation, brings about the longitudinal reciprocation of the carriage 100 to sweep the actuating arm 42 across the scale platform either in its horizontal or its elevated position, as the case may be. A slot 112 in the end of the arm is releasably engaged with a pin 114 projecting from the carriage 100, the relative movement between the pin and slot accommodating the oscillatory movement of the arm 108 in relation to the rectilinear reciprocation of the carriage.

Carriage movement is brought about by a connecting rod 116 pivoted to the arm 108 and connected with a crank shaft 118 on a crank lever 120 carried by shaft 122 (FIG. 4). Shaft 122 is driven by chain 124 and gears 126, 128. The chain derives motion from shaft 86 above described.

The oscillatory movement of the work propelling arm 42 is brought about by a cam 130 mounted on the shaft 132 which carries gear 126. Co-acting with cam is a cam follower 134 mounted on lever 136. This lever is also pivoted on pintle 110, being provided with a yoke 138 which engages the pintle 110 at opposite sides of the bearing 109 above mentioned (FIG. 5 and FIG. 6). The lever 136 is connected adjustably by link 140 with one of the arms 142 on the rock shaft 98 along which the carriage 10 is slidable. Carried by arms 142 is a bar 162 engaged by roller 164 in yoke 160 which straddle the bar 162. The yoke is mounted on a link 144 connected pivotally to one side or the other of the bell crank brackets 106 (cf. FIG. 5 and FIG. 6). As will be observed in FIG. 5 this bracket is pivoted at its outside to the pintle 104 and has its inside pivotal connection attached to the link 144. In FIG. 6 it is the right hand side of the bracket which is pivoted to the arm 102 and the left hand side of the bracket which is connected pivotally with link 144. The link 144 is guided by a clip 150 which is attached to carriage 100. At whichever side of the table propelling arm 42 may be located, the engagement of cam 130 with cam follower 134 on lever 136 will lift the arm 42 for its return movement and lower it for the purpose of feed movement. When the linkage 140 raises or lowers the bar 162, a corresponding motion is transmitted to the free side of the bell crank 106 to produce corresponding raising or lowering movement of the propelling arm 42. Through this means the propelling arm is raised to its dotted line position while the carriage 100 is making its return stroke, the arm 42 being lowered to its full line position after it clears the work on the scale platform 34 so that when the carriage again moves forwardly, the arm will engage the work and propel it from the scale platform onto the discharge conveyor.

All of the shafts and the driving connections thereto are permanently mounted but the sweep arm 42 and its carriage and the mechanism for mounting and reciprocating these parts, and the mechanism for oscillating the arm 42 are all interchangeably mounted to be operable at either side of the conveyor system, according to scale position.

The vale 165 which is biased by spring 166 to the left as viewed in FIG. 4 is drawn to the right by the bell crank 168 when the latter is oscillated by displacement of cam follower 170 by cam 172 on shaft 132. This controls the vacuum and pressure connections through the pipes 174 and 176 to control the label transfer mechanism as described in the prior United States patents above mentioned. The rotatable post 178 which carries the suction nozzle 216 is oscillated 180° by the rack 182 this being driven by bell crank 184 and cam follower 186 from cam 188 on shaft 122.

The intermittent driving of the conveyor belt 58 above described is accomplished by operating the belt over a pulley 190 driven by chain 192 from sprocket 194 (FIG. 9). Sprocket 194, in turn, is driven by chain 196, details of which are shown in FIG. 10. At intervals on chain 196 there are laterally projecting link portions 198, engaged from time to time by the bifurcated extremity 200 of a pair of levers on shaft 132 which, in each rotation, engages a pair of the extension links 198 to advance the chain for a predetermined distance sufficient to move a workpiece 44 from conveyor 46 onto the discharge conveyor 60, at the same time advancing another workpiece 44 from the position at the left in FIG. 9 to a position of engagement with stop 204, which is temporarily elevated in its path as shown at the right in FIG. 9. At the proper time, the stop 204 is withdrawn by lever 206 actuated by a cam on shaft 122 and transmitting motion to the stop through link 208.

The vacuum nozzle 216 is rotated on the axis of its supporting tube 215 while it rotates bodily with post 178, rotation being achieved by bevel gears 218, 220, the latter being nonrotatable and the former meshing therewith to rotate the nozzle 216.

The rectifier bar 54 mounted on the arm 52 is retracted to the left as viewed in FIG. 7 by the compression spring 222 and is moved to the right in work aligning direction by a flexible conductor 224 which preferably takes the form of a chain guided over pulley 226 and connected with a rod 228 headed at 230 for engagement with an apertured crank pin 232 through which the rod passes. The crank pin is on a crank 234 at the end of shaft 132.

The operation is as follows:

Assuming that the machine is organized as shown in FIGS. 1 and 4, a workpiece delivered on the pivoted conveyor 26 is arrested by contact with the raised end of conveyor 22. In automatic operation the cam 88 oscillates lever 35 to draw the right hand end of conveyor 22 downwardly. This operates through the lever 23 to raise the left hand end of conveyor 26, whereby the power operation of conveyor 22 will cause the incoming workpiece to advance onto the scale platform 34, where it will be weighed. The computer 36 will then function to transmit to the label printer 38 particulars for the printing of a label, and the label will be delivered face down onto the label chute 40.

Still assuming automatic operation, vacuum nozzle 216 picks up the label 180 and simultaneously rotates it on the axis of the horizontal pipe 215 and also rotates it 180° on the axis of post 178. This will leave the label right side up, and it will be transferred to a position beneath the suction pad 220 which is nested in the hot plate 177 at the top of the post 179.

Meantime, the sweep arm 42 will have advanced the workpiece from the scale platform 34 onto the conveyor belt 58 where it will temporarily remain at rest pending operation of the rectifier plate 54 which will move in from the side to align the workpiece with the position desired for application of the label. In the course of the next intermittent operation of the conveyor, the workpiece will advance from the position indicated at 54 in FIG. 9 to the position indicated at 44 in FIG. 9, where it will abut the retractable stop 204, actuated by link 208 and lever 206.

The suction pad is mounted at the top of a tubular post 227 which is vertically reciprocated by cam 221 on shaft 122, cam follower 223 and lever 225. The pipe 174 is connected to the lower end of post 227 to supply vacuum to the pad 220 for holding the label thereto. When the label carried by nozzle 216 is in registry beneath the suction pad 220, the pad is lowered to receive the label, and, at the same time, air pressure is applied to nozzle 216 to assist in transferring the label to pad 220. The pad 220 is raised, and the nozzle 216 on the end of pipe 215 is swung out of the way, at which time the pad 220 with label 180 is lowered to apply the label to the work 44, as described in U.S. Pat. 3,264,161. The stop 204 is then retracted. In the next operation of the conveyor 46 the weighed and wrapped workpiece is discharged.

Assuming that some of the workpieces delivered to scale platform 34 are of irregular form so that automatic operation is not desirable, an operator in position 62 can draw the entire label printer 38 toward himself from the full line position shown in FIG. 1 to the dotted line position shown at 38'. This puts the label chute within easy reach. Thereupon he dispenses with the automatic functioning of the label transfer mechanism and simply picks the workpiece manually from the scale platform and presses it against the label on the chute, the label having its adhesive surface softened to engage and adhere to the workpiece.

Assuming that new orientation is desired whether by reason of installation in a particular physical plant or by reason of the fact that it may be desired that the operator stand in position 64 at the opposite side of the machine (FIG. 2), there are only two changes required, one involving the mere lifting and reversal of the scale in the gap between the conveyors 22 and 46. The other operation is slightly more complex, but it is accomplished without disturbing very many of the driving connections above described. The changes made are shown by a comparison of FIG. 5 with FIG. 6. The panel 240 which protects the operator is removed and the various actuating parts are then connected at the opposite ends of the same shafts by which they were operated in their FIG. 5 positions. Only those connections which support and operate the work propelling arm 42 must be removed from their respective mountings at the left side of the machine as shown in FIG. 5 and relocated in corresponding positions at the right side of the machine as shown in FIG. 6.

In this preferred embodiment no substitute parts are required. All parts which require reversal are so made as to be reversible. Those which have to be turned around are so designed as to permit this change. Upon completion of transfer of the parts in question, the protective guard 240 is re-established between the operator's position and the machine, being at the right as viewed in FIG. 6.

While the workpiece still moves across the machine in the same sequence and in the direction indicated by the arrows in FIGS. 1 and 2, the changed position of the operator has the effect of causing the workpieces to move past him from left to right, instead of from right to left.

The indexer or infeed conveyor as shown in FIGS. 1, 2, 4, and 13 provides a simplified and improved escapement mechanism for feeding the packages in spaced relation to the scale 34. The indexer may be physically separate from the label machine, or integrated therewith, as shown. The upstream roller conveyor section 26 and downstream roller conveyor section 22 are oscillated in an escapement cycle which feed packages to the scale in timed relation to the weighing and labeling cycle.

Bell crank lever 35 pivots on the pintle 250. The end of the bell crank lever 35 is connected to a link 251 on the pin 252. The other end of link 251 is pivotally connected to the downstream conveyor section 22 on pin 249.

The lever 23 which oscillates frame 30 of conveyor 26 pivots on a pintle 253. This lever is characterized herein as a walking beam. The lower end of lever or walking beam 23 has a roller 254 which bears against the undersurface of the bell crank lever 35. The other end of lever 23 carries a roller 255 which bears against the pad 256 on the undersurface of frame 30.

Front end roller 257 on downstram roller conveyor frame 22, and the two tail end rollers 258, 259 on said frame, are power driven by belts 96, 263. The two rollers 258, 259 are interconnected by the gear set 265. These rollers are knurled to provide good friction thrust against the undersurface of the package 44.

The escapement cycle is illustrated in FIGS. 4 and 13. FIG. 4 shows the point in the cycle where an incoming package 44 arrives on the indexer when the downstream roller conveyor frame 22 is elevated with respect to upstream roller conveyor frame 30. This is because roller 90 on the lower end of bell crank lever am 35 is against the low lobe of the cam 264. The foward end of downstream roller conveyor frame 22 has an abutment bar 266 against which the package 44 comes to rest.

FIG. 13 shows the point in the cycle when the bell crank lever arm 35 has been rotated clockwise as shown in this figure as a consequence of the high cam lobe 264 on the cam 88 having engaged the roller 90 on the lower end of the lever arm 33.

This clockwise motion of the bell crank lever arm 35 lowers the downstream frame 22 and by imparting motion counter-clockwise to the walking beam lever 23 concurrently raises the frame 30 until the two frames are aligned as shown in FIG. 13. The package 44 then advances by gravity until its undersurface is engaged by the head end driven roller 257 which will then accelerate the package 44 in the direction of arrow 267. The package 44 will be further propelled as it passes over the tail end driven rollers 258, 259 and will be projected onto the scale platform 34 to its position thereon as shown in FIG. 2.

Cam lobe 264 has a short circumferential extent so that as soon as the package 44 has passed over the head end roller 257, the conveyor sections 22, 30 will be restored to their positions shown in FIG. 4 to arrest the next package 44 against the stop bar 266 and hold it in that position pending the next mutual oscillation of the sections 22, 26.

The respective frames 22, 26 are pivotally mounted at their mutually remote ends. Their proximate ends are concurrently oscillated in opposite directions of rotation by the action of the bell crank 35 and walking beam lever 23.

The indexer is much simpler than those heretofore known to us, for example, the one shown in United States Patent 3,155,222, in that the relative oscillatory movement of the two conveyor sections is accomplished by joint action of the bell crank arm 35 and walking beam lever 23.

It will be understood that no attempt has been made to show specific dimensions or cam shapes, or the precise timing.

We claim:

1. In a weighing and labeling machine for weighing a package and applying a label thereto and comprising a package input conveyor table, a package output conveyor table, a gap between said tables, a scale having a platform in said gap, a label applicator having a predetermined label applying position downstream from the input end of the output conveyor table and means for moving the packages longitudinally from the scale onto the input end of the output conveyor table, the improvement for aligning such packages with the label applicator without pushing the packages laterally on the scale platform and comprising power-operated rectifying means associated with the output conveyor table between the input end of the output conveyor and said label applicator and means actuating said rectifying means for pushing the packages laterally of the output conveyor in time with the means for pushing the packages longitudinally, thus to align such packages with the label applicator.

2. In a weighing and labeling machine for weighing a package and applying a label thereto and comprising a package input conveyor table, a package output conveyor table, a gap between said tables, a scale having a platform in said gap, a label applicator having a predetermined label applying position downstream from the input end of the output conveyor table and means for moving the packages longitudinally from the scale onto the input end of the output conveyor table, the improvement for aligning such packages with the label applicator without pushing the packages laterally on the scale platform and comprising power-operated rectifying means associated with the output conveyor table between the input end of the output conveyor and said label applicator and means actuating said rectifying means for pushing the packages laterally of the output conveyor in time with the means for pushing the packages longitudinally, thus to align such packages with the label applicator, said rectifying means comprising a rectifying arm normally lying at one lateral side of the output conveyor table and having a supporting arm upon which the rectifying arm is movable laterally toward the center of the output conveyor table.

3. A weighing and labeling machine according to claim 2 in which said output conveyor table comprises a series of driven rollers, means for operating said rollers intermittently and providing dwells between periods of intermittent operation, and means for operating said supporting arm and rectifying arm during periods of dwell.

4. A weighing and labeling machine according to claim 3 in which the label applicator has means synchronized for operating it to apply a label to a workpiece during one of said periods of dwell.

References Cited

FOREIGN PATENTS 263,994  10/1964  Australia _____ 156—306

ROBERT F. BURNETT, Primary Examiner

R. A. DAWSON, Assistant Examiner

U.S. Cl. X.R.

156—362, 566; 198—34, 39